(12) United States Patent
Philippi et al.

(10) Patent No.: US 6,483,596 B1
(45) Date of Patent: Nov. 19, 2002

(54) METHOD OF CALIBRATING AN APPARATUS FOR PRODUCING A THREE-DIMENSIONAL OBJECT, CALIBRATION APPARATUS AND METHOD AND APPARATUS FOR PRODUCING A THREE-DIMENSIONAL OBJECT

(75) Inventors: Jochen Philippi, München (DE); Andreas Lohner, Haar (DE)

(73) Assignee: EOS GmbH Electro Optical Systems (DE)

( * ) Notice: Subject to any disclaimer, the term of this patent is extended or adjusted under 35 U.S.C. 154(b) by 0 days.

(21) Appl. No.: 09/557,065

(22) Filed: Apr. 21, 2000

(30) Foreign Application Priority Data

Apr. 23, 1999 (DE) ......................................... 199 18 613

(51) Int. Cl.[7] ......................... G01B 11/14; B29C 35/04; C23C 20/00; B32B 31/00; G06F 19/00
(52) U.S. Cl. ...................... 356/614; 356/615; 264/401; 427/581; 427/510; 156/272.8; 156/273.3; 702/86; 700/120; 359/462
(58) Field of Search ................................ 356/614, 615, 356/121, 398; 264/401, 406; 156/273.3, 273.5, 272.8; 700/120; 427/581, 510; 702/86, 95; 359/462, 466, 470; 118/620

(56) References Cited

U.S. PATENT DOCUMENTS

| | | | | |
|---|---|---|---|---|
| 4,660,981 A | | 4/1987 | Stridsberg .................... | 356/615 |
| 4,752,498 A | * | 6/1988 | Fdim ........................... | 427/510 |
| 5,011,635 A | * | 4/1991 | Murphy et al. ............... | 264/401 |
| 5,031,120 A | * | 7/1991 | Pomerantz et al. .......... | 700/120 |
| 5,133,987 A | | 7/1992 | Spence et al. ................ | 427/581 |
| 5,173,220 A | * | 12/1992 | Reiff et al. ................... | 264/401 |
| 5,832,415 A | * | 11/1998 | Wilkening et al. ............ | 702/86 |
| 6,159,411 A | * | 12/2000 | Kulkarni et al. ............. | 264/401 |
| 6,399,010 B1 | * | 6/2002 | Guertin et al. ............... | 264/401 |
| 6,406,658 B1 | * | 6/2002 | Manners et al. ............. | 264/401 |

FOREIGN PATENT DOCUMENTS

| | | |
|---|---|---|
| EP | 0 734 842 B1 | 10/1996 |
| EP | 0 734 842 A1 | 10/1996 |
| EP | 0 792 481 B1 | 9/1997 |
| WO | WO 89/11085 | 11/1989 |
| WO | WO 90/09559 | 8/1990 |
| WO | WO 94/15265 | 7/1994 |
| WO | WO 96/12217 | 4/1996 |

* cited by examiner

*Primary Examiner*—Loha Ben
(74) *Attorney, Agent, or Firm*—George W. Neuner; Edwards & Angell, LLP

(57) ABSTRACT

The invention refers to a method for calibrating the control of a radiation device producing electromagnetic radiation or particle radiation in a rapid prototyping system. The method comprises the steps of arranging a calibration plate at a defined position in the rapid prototyping system, the calibration plate having an upper side with a first region and a second region separate from the first region, the first region being provided with optically detectable reference marks and the second region having a medium which is sensitive to the radiation of the radiation device, producing a test pattern by exposing said medium to said radiation at predetermined desired positions defined by position coordinate data, digitizing the first region of the calibration plate with the reference marks thereon and the second region of the calibration plate having the test pattern, comparing the digitized reference marks and the digitized test pattern and calculating and providing correction data for the control of the radiation device on the basis of the comparison.

12 Claims, 2 Drawing Sheets

METHOD OF CALIBRATING AN APPARATUS FOR PRODUCING A THREE-DIMENSIONAL OBJECT, CALIBRATION APPARATUS AND METHOD AND APPARATUS FOR PRODUCING A THREE-DIMENSIONAL OBJECT

BACKGROUND OF THE INVENTION

The invention relates to a method of calibrating an apparatus for producing a three-dimensional object, a calibration apparatus and a method as well as an apparatus for producing a three-dimensional object.

Document EP 0 792 481 B1 discloses an apparatus for producing a three-dimensional object and a method of calibrating the control for deflecting a laser beam for rapid prototyping systems. According to this method a test pattern is generated by exposing a light-sensitive material to a laser beam at predetermined desired positions on the basis of position coordinate data. Portions of this test pattern are ditigized and the portions are combined to form an overall pattern. Correction data for the control can be calculated and provided by comparing the actual positions of the laser beam on the overall pattern with the position coordinate data. However, it is not possible to absolutely calibrate the control, because, in this method, the exact position of the light-sensitive medium in the rapid prototyping system is unknown. This is a particular disadvantage, if the rapid prototyping system is used to form an object on a presintered plate and the finished object is removed together with the plate from the rapid prototyping system, as described in document EP 0 734 842 A. The compatibility with following processes, for example the postprocessing in computer-controlled machine tools, is difficult, since the object to be formed can not be absolutely and exactly positioned on the presintered plate.

Document WO 94/15265 discloses a method of calibrating a rapid prototyping system whereby a base in the rapid prototyping system is aligned relative to a coordinate system defined by the scanner system. The base is provided with a plurality of square ink marks. The laser beam is directed to the center of each square whereby the ink is removed thereat. Thereafter the base is digitized and each center of the squares and of the radiation marks is detected to calculate correction data from the deviations therebetween.

U.S. Pat. No. 4,660,981 discloses a method and an apparatus for calibrating the deflection of a light beam using a frame arranged in the working surface of the light beam and having a plurality of holes therein. A light-sensitive detector is secured in each of the holes. Whenever the light beam is deflected onto one of the holes the corresponding detector produces a signal. In case that this signal does not correspond to the maximum signal produced if the light beam precisely hits the hole, the deflection device is re-adjusted correspondingly.

OBJECTS OF THE INVENTION

It is an object of the invention to provide an improved method of calibrating an apparatus for producing a three-dimensional object. It is a further object of the invention to provide an improved apparatus for calibrating a radiation device of an apparatus for producing a three-dimensional object. It is a still further object of the invention to provide an improved apparatus and method for producing a three-dimensional object.

SUMMARY OF THE INVENTION

According to a first aspect the invention provides a method of calibrating an apparatus for producing a three-dimensional object by solidifying a material in subsequent layers of said object at places corresponding to cross-sections of said object in said layers using a focused beam of a radiation solidifying said material, said object being built on a plate defining an invariable coordinate system which is fixed relative to said apparatus, the method comprising the steps of providing detectable reference marks on said plate for calculating said coordinate system, operating control means for deflecting said focused radiation beam to predetermined desired positions in said coordinate system, detecting the actual positions of said deflected radiation beam on said plate, determining a deviation of said actual positions from said desired positions on the basis of said reference marks, and adjusting said control means on the basis of the determined deviations.

According to a further aspect the invention provides a method of producing a three-dimensional object, comprising providing a building platform having reference marks defining an invariable machine coordinate system, forming subsequent layers of a material on said building platform, said material being solidifiable by a focused radiation beam, scanning a focused radiation beam across said layers for solidifying said material at places corresponding to cross-sections of said object in said layers, and treating said solidified object in a following processing step whereby said solidified object is aligned and/or treated using said reference marks of said building platform.

According to a still further aspect the invention provides a calibration apparatus for calibrating a radiation device of an apparatus for producing a three-dimensional object by solidifying a material in subsequent layers of said object at places corresponding to cross-sections of said object in said layers, using a focused beam of a radiation solidifying said material, said layers being formed on a plate defining a machine coordinate system which is fixed relative to said apparatus, said calibration apparatus comprising a first region having optically detectable reference marks, a second region provided with a medium which is sensitive to said radiation of said radiation device, and adjustment means for positioning said calibration apparatus at a defined position in said machine coordinate system.

According to a still further aspect the invention provides an apparatus for producing a three-dimensional object by solidifying a material in subsequent layers at places corresponding to cross-sections of said object in said layers, using a focused beam of a radiation solidifying said material, said apparatus comprising carrier means defining a machine coordinate system which is fixed relative to said apparatus, radiation means issuing said focused radiation beam, and calibration means arranged on said carrier means at defined positions in said machine coordinate system, said calibration means having a first region with optically detectable reference marks and a second region with a medium which is sensitive to said focused radiation beam.

According to a still further aspect the invention provides a method of producing a three-dimensional object, comprising providing a building platform having reference marks defining an invariable machine coordinate system, reading geometrical data defining said object in an object coordinate system, aligning said object coordinate system to said machine coordinate system, forming subsequent layers of a material on said building platform, said material being solidifiable by a focused radiation beam, and scanning a focused radiation beam across said layers for solidifying said material at places corresponding to cross-sections of said object in said layers.

According to a further development of the inventive method the test pattern is produced spatially separate from the evaluation of the test pattern. According to a further development of the method the digitized test pattern is compared with the position coordinate data and correction data for the control of the radiation device are calculated and provided on the basis of the comparison. Preferably the digitalization is made using a pixel scanner or a digital camera. According to a further embodiment the digitalization is carried out using an image recording device and a computer for subsequent digitalization.

Preferably, the reference marks used as reference features are arranged along two lines including an angle of preferably 90° therebetween.

Preferably, a long side and a short side of a calibration plate are used as reference marks or features. Preferably, bores receiving adjustment pins are provided at the lower side of the calibration plate. Preferably adjustment pins are provided at the lower side of the calibration plate.

Preferably, the medium is a radiation-sensitive film attached to the upper side of the calibration plate. According to a further development the calibration plate is larger than the building area for the object and the first region of the calibration device having the optically detectable reference marks thereon is outside of the working area, if the calibration plate is arranged in the apparatus for producing the object.

Preferably the calibration apparatus is a calibration plate. The calibration plate has, on its upper side, a first region having optically detectable reference marks and a second region provided with a medium which is sensitive to the radiation issued by the radiation apparatus. The first region is separate from said second region.

BRIEF DESCRIPTION OF THE DRAWINGS

Further advantages, features and objects of the invention will be apparent from the description of exemplary embodiments with reference to the drawings. In the drawings.

DESCRIPTION OF PREFERRED EMBODIMENTS

Figure 1:
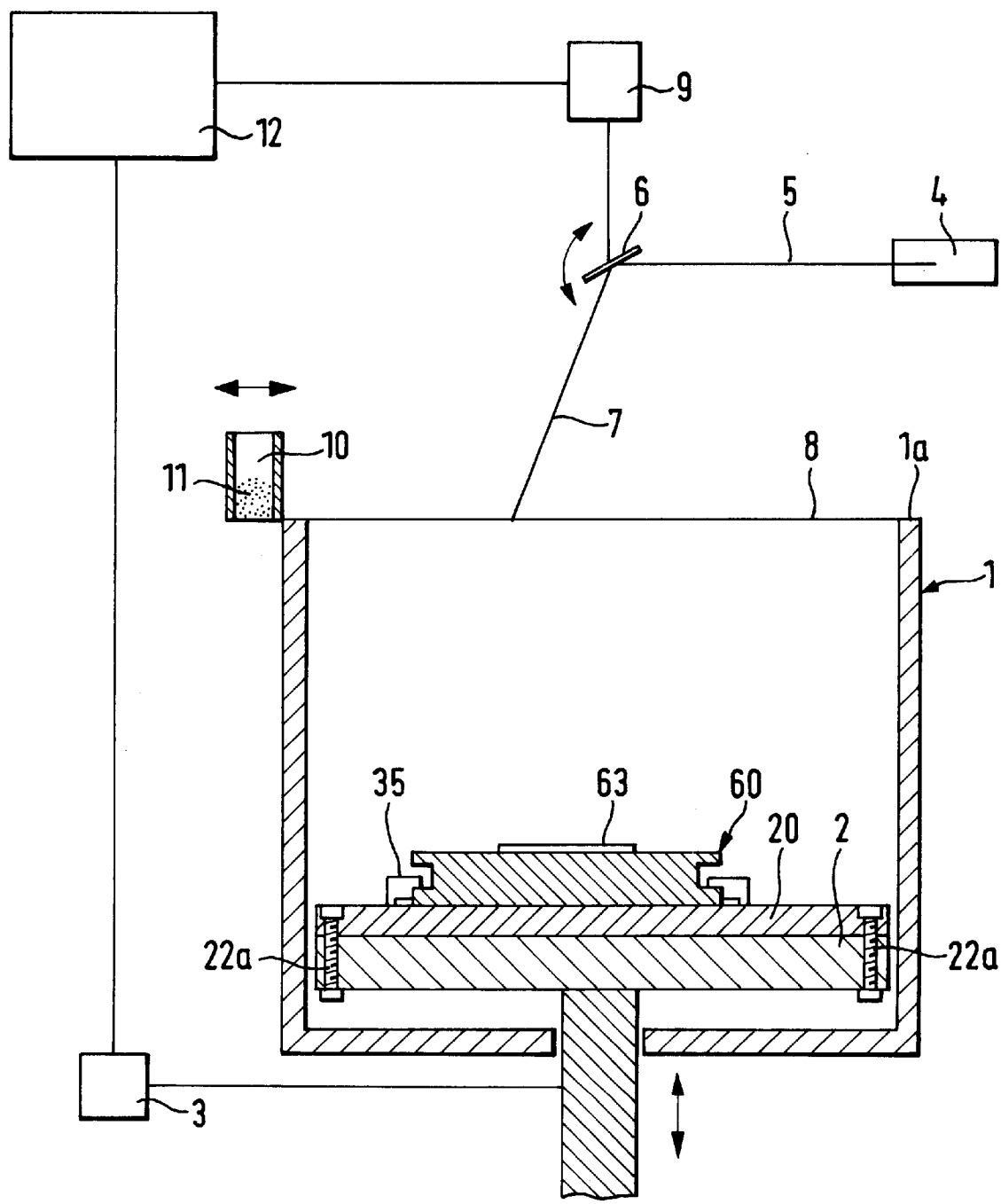
FIG. 1 is a schematic and partially sectional side view of an apparatus for producing a three-dimensional object.

As shown in FIG. 1 a rapid prototyping system, being an apparatus for producing a three-dimensional object by layerwise solidification of a building material, comprises a container 1 having an open top, an object carrier provided within the container and having a base plate 2 which can be selectively lifted and lowered in vertical direction by means of a schematically indicated elevation adjustment device 3. The apparatus further comprises a radiation source 4 located above the container 1 and being formed as a laser issuing a focused laser beam 5. The laser beam 5 is deflected by a deflection apparatus 6, for example a rotating mirror, and focused as a deflected beam 7 onto a working plane 8 defined by the top edge 1a of the container. The radiation source 4 and the deflection apparatus 6 together form a radiation apparatus. A control device 9 controls the deflection apparatus 6 so as to direct the deflected beam 7 to any desired point in the working plane 8. Moreover, an applying apparatus 10 is provided for applying a uniform layer of a powder material 11 which can be solidified under the influence of the electromagnetic radiation. The elevation adjustment device 3 and the control device 9 for the radiation apparatus are both connected to a central control unit 12 formed as a computer for coordinated control of the apparatus.

The upper side of the base plate 2 has a platform carrier in the form of a plate 20 detachably mounted thereto, for example by means of bolts 22a. A calibration apparatus, preferably a calibration plate 60, is arranged on the plate 20. As shown in particular in FIG. 2, a through-bore 22 is provided spaced from each corner of the plate for passing the fastening bolts 22a therethrough for fastening the plate 20 to the base plate 2. A plurality of tolerance gauge bores 23 is provided at the upper side of the plate 20. The gauge bores 23 have a first section 24 formed as a threaded blind bore and a following coaxial second section 26 being threadless and extending up to the plate surface. The second section 26 has a greater diameter than the first section 24 and serves the purpose of receiving positioning pins 27 mounted to the bottom side of the calibration plate 60. The gauge bores 23 are arranged in a plurality of parallel rows 28a, 28b, . . . 28g and equidistant in each row.

Figure 2:
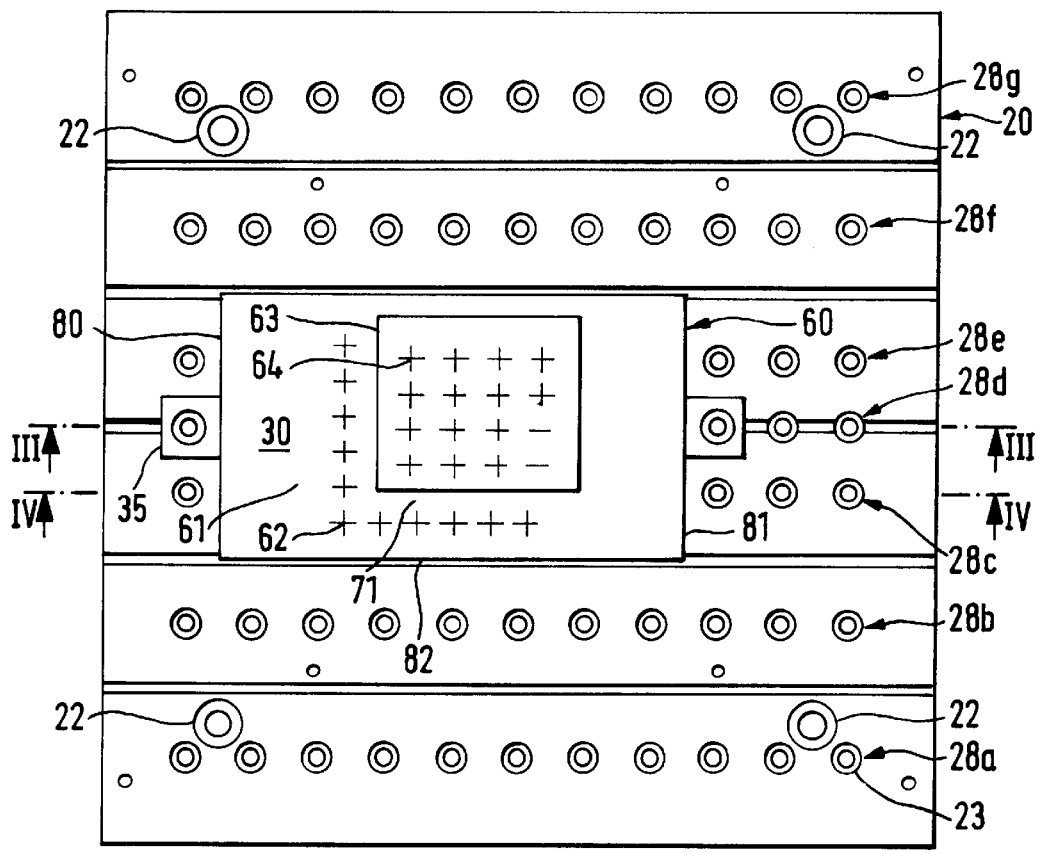
FIG. 2 is a top view of a platform carrier having a calibration plate clamped thereon.
Figure 3:
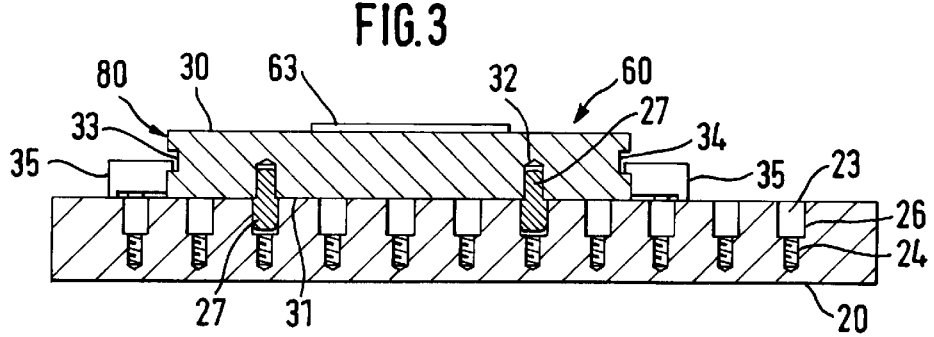
FIG. 3 shows a cross-section through the platform carrier with the calibration plate clamped thereon, along line III—III of FIG. 2.
Figure 4:
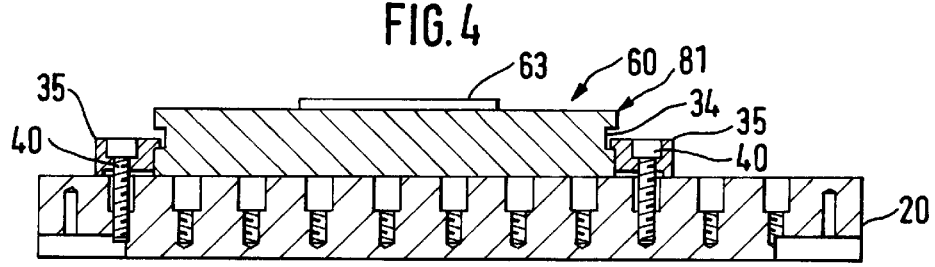
FIG. 4 shows a cross-section through the platform carrier with the calibration plate clamped thereto, along line IV—IV of FIG. 2.

As shown in particular in the FIGS. 2 to 4, the calibration plate 60 is of a substantially parallelepiped shape having an upper side 30 and a lower side 31 facing the plate 20 when assembled. The lower side 31 has pocket bores 32 therein for fittingly receive the positioning pins 27. The spacing of the pocket bores 32 corresponds to the spacing of the corresponding gauge bores 23 on the plate whereby the calibration plate 60 can be located at desired positions on the plate 20 by means of the positioning pins 27. Preferably, two pocket bores 32 are provided at the lower side of the calibration plate. Each long side 80, 81 of the calibration plate 60 has a corresponding groove 33, 34 therein, the grooves having a rectangular cross-section and running parallel to the lower side 31 at a predetermined distance therefrom. Clamping elements 35 fastened by means of bolts 40 screwed into the gauge bore 23 engage the grooves 33, 34 for locking the calibration plate in place. The calibration apparatus comprises reference features which are optically detectable and geometrically sufficient to define all the required degrees of freedom of movement, for example an x-axis or a y-axis of a rectangular coordinate system. Preferably, the reference features are reference marks.

The upper side 30 of the calibration plate 60 has a first region 61 and a second region 71 separate from the first region 61. The first region 61 has a plurality of reference crosses 62 thereon. Corresponding adjacent reference crosses 62 have a predetermined distance therebetween. Moreover, the reference crosses 62 are arranged along two lines including an angle of 90°. The reference crosses 62 are for example painted to the upper side of the calibration plate 60.

A medium which is sensitive to a wavelength of the laser radiation and/or a certain laser power, preferably a light-sensitive film 63, is arranged in the second region 71. The light-sensitive film 63 may for example be thermo-sensitive paper or UV-sensitive photographic paper. The film 63 is fastened to the upper side 30 of the calibration plate 60, for example by pasting the film 63 to the calibration plate 60.

For calibrating the control of the radiation apparatus the calibration plate 60 is positioned on the plate 20 as shown in the figures. This defines the absolute position of the calibration plate 60 on the plate 20, whereby the absolute position of the reference crosses 62 on the plate 20 is likewise univocally and reproducibly defined. The reference crosses 62 therefore define a machine coordinate system on the plate 20 or on the base plate, resp. Thereafter, the base plate 2 is displaced so as to position the upper side 30 of the calibration plate 60 in the working plane 8. Subsequently the light-sensitive film 63 is exposed to radiation by deflecting the laser beam 5, by means of the deflection apparatus 6, to predetermined positions on the film 63 for producing a test pattern. The deflection of the laser beam 5 by means of the deflection apparatus 6 is made on the basis of a correction table which is for example analytically generated and associates the deflection coordinates for the deflection device 6 to the corresponding actual coordinates, i.e. the points of intersection of the laser beam 7 and the working plane 8. Preferably, the light-sensitive film is exposed in the form of a plurality of adjustment crosses 64. The crossing points of the individual adjustment crosses 64 are arranged to represent a grid or array of actual coordinates.

The test pattern is generated in a very short time period, about 30 seconds or less. The probability of a considerable drift of the laser 4 or of the deflection apparatus 6 in this time period is very low. Thus, the test pattern retains a stationary state of the laser 4 and of the deflection apparatus 6.

Next, the upper side 30 of the calibration plate 60, i.e. the first region 61 having the reference crosses 62 and the second region 71 having the test pattern on the film 63, is digitized. This can be carried out by means of a pixel scanner, a video camera with subsequent digitalization or with a digital camera. The digitized upper side 30 of the calibration plate 60 is then evaluated by an evaluation program. A dislocation or rotation of the radiation coordinate system determined by the adjustment crosses 64 with respect to the machine coordinate system is determined by comparing the positions of the adjustment crosses 64 with the positions of the reference crosses 62. The correction table can thereafter be updated on the basis of the comparison so as to obtain conformity between the radiation coordinate system and the machine coordinate system. The control of the radiation apparatus is thereby calibrated in an absolute manner.

Also further distortions caused by the radiation apparatus can be determined by means of the evaluation program by comparing the predetermined coordinates for the adjustment crosses 64 with the digitized positions of the adjustment crosses, and entered into the correction table.

In the inventive method for producing the three-dimensional object, data defining the geometry of the object, in the form of CAD data, are first stored in an object coordinate system. Thereafter the object coordinate system is aligned with the machine coordinate system, whereby the virtual object defined by its data is positioned in a virtual construction space. Thereafter, the object is constructed in conventional manner layer by layer on the plate, whereby the radiation apparatus is controlled on the basis of the data defining the geometry of the object. The above-described calibration of the apparatus absolutely calibrates the virtual construction space in relation to the apparatus.

The inventive method for calibrating an apparatus for producing a three-dimensional object and the calibration apparatus are particularly suitable in cases in which the object is produced using a material which is solidified by means of a laser having an infrared wavelength, for example a $CO_2$ laser.

After calibrating a rapid prototyping system in this way the three-dimensional object to be produced can be absolutely positioned on the plate. By absolutely positioning the object on the plate the object is constructed in a defined coordinate system which can be transferred to successor processes. For example, the entire plate 20 can be removed together with the object after completion of the construction process and placed into the post-processing apparatus, if the plate is made according to standards allowing the plate to be placed into known devices for post-processing the object. An example for such a post-processing apparatus is a CNC-controlled milling machine. Owing to the known absolute position of the object on the plate the position of the object in the post-processing apparatus is likewise known. According to a further preferred embodiment the object is constructed on the plate 20 so as to be produced on a separate base or own building platform which can be absolutely positioned on the plate 20 for example by means of the adjustment pins inserted into the tolerance gauge bores of the plate 20, such as the calibration plate. The object together with the base can thereafter be placed at predetermined and well-defined positions relative to the machine frame in a post-processing apparatus having a plate corresponding to the plate 20. Plural objects can be constructed by attaching plural building platforms onto the plate 20 side by side.

In a further preferred embodiment the base, the building platform or the plate 20, respectively, is designed for defined applications so as to fit to a certain apparatus or to be combined with certain elements. For example, the object may be part of a die-casting mould or of some other tool whereby the base or the building platform is mounted in a base or standard tool or in a recess designed therefor. The object may also be part of a greater object whereby the object is combined or assembled with other objects which are manufactured in the same or in a different manner.

The invention is not limited to the above-described embodiment, but covers further embodiments, especially the following ones.

According to one further embodiment the calibration plate is larger than the entire construction area of the rapid prototyping system. In such a calibration plate the film covers the entire construction area and the first region having the adjustment crosses therein is outside of the construction area. Thus, the entire construction area can be measured and absolutely calibrated in one step.

According to a further embodiment the long side 80 and one adjacent short side 82 of the calibration plate 60 are high precision ground. In this case the precision ground edges constitute the reference features of the calibration apparatus and serve as adjustment marks for defining the machine coordinate system. Alternatively bores arranged at defined places may serve as reference features.

According to a further embodiment the calibration plate has, in a top view, a square shape whereby the reference features are two lines of cross markings including an angle of 90° therebetween and the film to be exposed is attached in the square region therebetween. The calibration plate is exactly positioned by means of three cylindrical pins inserted into reference bores in the base plate below. It is not required to screw on or additionally fasten the calibration plate, because the calibration method does not produce forces onto the calibration plate.

When using a high-power laser, for example in a metal sintering process, the test pattern can be directly marked on a metal plate which may be coated or not.

It is not necessary that the two above-mentioned regions on the calibration apparatus are separate from each other.

For example, the reference features may be lines or crosses including an angle of 0° or 90° therebetween and the test pattern may be generated from lines or crosses including angles of 45° and 135°. It is also possible to use lines or crosses as reference features, and circles having their center on the crossing points as test pattern.

The steps of digitizing and evaluating can be carried out in the rapid prototyping system or in an external apparatus having a separate computer.

Although the invention has been described with reference to specific example embodiments, it is to be understood that it is intended to cover all modifications and equivalents within the spirit and scope of the appended claims.

What is claimed is:

1. A method of calibrating an apparatus for producing a three-dimensional object by solidifying a material in subsequent layers of said object at places corresponding to cross-sections of said object in said layers using a focused beam of a radiation solidifying said material, said object being built on a plate defining an invariable coordinate system which is fixed relative to said apparatus, said method comprising the steps of
a) providing detectable reference features on said plate for calculating said coordinate system,
b) operating control means for deflecting said focused radiation beam to predetermined desired positions in said coordinate system,
c) detecting the actual positions of said deflected radiation beam on said plate,
d) determining the deviations of said actual positions from said desired positions on the basis of said reference features, and
e) adjusting said control means on the basis of said determined deviations.

2. The method of claim 1, comprising the further steps of locating a calibration apparatus at a predetermined position in a machine coordinate system, the calibration apparatus having a first region comprising optically detectable reference features and a second region comprising a medium which is sensitive to said radiation of said focused beam, generating a test pattern by exposing said medium to said radiation at predetermined desired positions on the basis of position coordinates, digitizing said first region of said calibration apparatus comprising said reference features and said second region of said calibration apparatus comprising said test pattern, comparing said digitized reference features with said digitized test pattern and calculating and providing correction data for said control means on the basis of said comparison.

3. The method of claim 2, wherein said calibration apparatus is a calibration plate.

4. The method of claim 2, wherein said first region is located aside of or below said second region.

5. The method of claim 2, comprising using a plurality of adjustment crosses for said test pattern, the crossing points of said adjustment crosses forming a coordinate grid.

6. A method of producing a three-dimensional object, comprising providing a plate having reference marks defining an invariable machine coordinate system, forming subsequent layers of a material on said plate, said material being solidifiable by a focused radiation beam, scanning a focused radiation beam across said layers for solidifying said material at places corresponding to cross-sections of said object in said layers, and treating or applying said solidified object in a following processing step whereby said solidified object is aligned and/or treated using said reference marks of said plate.

7. Calibration apparatus for calibrating a radiation device of an apparatus for producing a three-dimensional object by solidifying a material in subsequent layers at places corresponding to cross-sections of said object in said layers using a focused beam of a radiation solidifying said material, said layers being formed on a plate defining a machine coordinate system which is fixed relative to said apparatus, said calibration apparatus comprising
a first region having optically detectable reference marks,
a second region provided with a medium which is sensitive to said radiation of said focused beam, and
adjustment means for positioning said calibration apparatus at a defined position in said machine coordinate system.

8. The calibration apparatus of claim 7, comprising a calibration plate.

9. The calibration apparatus of claim 8, said medium comprising a radiation-sensitive film pasted onto the upper side of said calibration plate.

10. The calibration apparatus of claim 7, wherein said reference marks are arranged along two lines including an angle of preferably 90° therebetween.

11. An apparatus for producing a three-dimensional object by solidifying a material in subsequent layers of said object at places corresponding to cross-sections of said object in said layers, using a focused beam of a radiation solidifying said material, said apparatus comprising carrier means defining a machine coordinate system which is fixed relative to said apparatus, radiation means delivering said focused radiation beam, and calibration means arranged on said carrier means at a defined position in said machine coordinate system, said calibration means having a first region with optically detectable reference marks and a second region provided with a medium which is sensitive to said focused radiation beam of said radiation means.

12. A method of producing a three-dimensional object, comprising providing a plate having reference features thereon defining an invariable machine coordinate system, reading geometrical data defining said object in an object coordinate system, aligning said object coordinate system to said machine coordinate system, forming subsequent layers of a material on said plate, said material being solidifiable by a focused radiation beam, and scanning a focused radiation beam across said layers for solidifying said material at places corresponding to cross-sections of said object in said layers to thereby form said object on said plate.

* * * * *